United States Patent
Ono et al.

(10) Patent No.: US 10,373,028 B2
(45) Date of Patent: Aug. 6, 2019

(54) PATTERN RECOGNITION DEVICE, PATTERN RECOGNITION METHOD, AND COMPUTER PROGRAM PRODUCT

(71) Applicants: KABUSHIKI KAISHA TOSHIBA, Minato-ku, Tokyo (JP); TOSHIBA DIGITAL SOLUTIONS CORPORATION, Kawasaki-shi, Kanagawa (JP)

(72) Inventors: Soichiro Ono, Tachikawa Tokyo (JP); Hiroyuki Mizutani, Yokohama Kanagawa (JP)

(73) Assignees: KABUSHIKI KAISHA TOSHIBA, Tokyo (JP); TOSHIBA DIGITAL SOLUTIONS CORPORATION, Kawasaki-Shi (JP)

(*) Notice: Subject to any disclaimer, the term of this patent is extended or adjusted under 35 U.S.C. 154(b) by 0 days.

(21) Appl. No.: 15/708,367

(22) Filed: Sep. 19, 2017

(65) Prior Publication Data
US 2018/0005087 A1 Jan. 4, 2018

Related U.S. Application Data

(63) Continuation of application No. PCT/JP2015/063522, filed on May 11, 2015.

(51) Int. Cl.
*G06K 9/00* (2006.01)
*G06K 9/62* (2006.01)
(Continued)

(52) U.S. Cl.
CPC ........... *G06K 9/6277* (2013.01); *G06K 9/342* (2013.01); *G06K 9/4642* (2013.01);
(Continued)

(58) Field of Classification Search
None
See application file for complete search history.

(56) References Cited

U.S. PATENT DOCUMENTS

| | | | | |
|---|---|---|---|---|
| 5,923,778 A | * | 7/1999 | Chen | G06K 9/80 382/185 |
| 7,844,114 B2 | * | 11/2010 | Chellapilla | G06K 9/80 382/181 |

(Continued)

FOREIGN PATENT DOCUMENTS

| JP | 8-202830 | 8/1996 |
|---|---|---|
| JP | 2003-308090 | 10/2003 |
| JP | 2012-118650 | 6/2012 |

OTHER PUBLICATIONS

International Search Report for International Patent Application No. PCT/JP2015/063522 dated Aug. 11, 2015, 5 pages.
(Continued)

*Primary Examiner* — Soo Jin Park
(74) *Attorney, Agent, or Firm* — Amin, Turocy & Watson LLP

(57) ABSTRACT

According to an embodiment, a pattern recognition device is configured to divide an input signal into a plurality of elements, convert the divided elements into feature vectors having the same dimensionality to generate a set of feature vectors, and evaluate the set of feature vectors using a recognition dictionary including models corresponding to respective classes, to output a recognition result representing a class or a set of classes to which the input signal belongs. The models each include sub-models each corresponding to one of possible division patterns in which a signal to be classified into a class corresponding to the model can be divided into a plurality of elements. A label expressing a model including a sub-model conforming to the set of feature vectors, or a set of labels expressing a set of models including sub-models conforming to the set of feature vectors is output as the recognition result.

7 Claims, 6 Drawing Sheets

(51) Int. Cl.
*G06K 9/46* (2006.01)
*G06K 9/48* (2006.01)
*G10L 25/03* (2013.01)
*G10L 25/27* (2013.01)
*G10L 25/45* (2013.01)
*G06K 9/34* (2006.01)
*G06N 7/00* (2006.01)
*G06N 20/00* (2019.01)
*G10L 15/14* (2006.01)

(52) U.S. Cl.
CPC ........... *G06K 9/4685* (2013.01); *G06K 9/481* (2013.01); *G06K 9/6212* (2013.01); *G06K 9/6265* (2013.01); *G06N 7/005* (2013.01); *G06N 20/00* (2019.01); *G10L 25/03* (2013.01); *G10L 25/27* (2013.01); *G10L 25/45* (2013.01); *G06K 2209/011* (2013.01); *G06K 2209/013* (2013.01); *G10L 15/14* (2013.01)

(56) References Cited

U.S. PATENT DOCUMENTS

| | | | |
|---|---|---|---|
| 8,965,126 B2* | 2/2015 | Yamazoe | G06K 9/723 382/177 |
| 9,280,725 B2* | 3/2016 | Kimura | G06K 9/72 |
| 9,536,180 B2* | 1/2017 | Deselaers | G06K 9/723 |
| 2003/0200090 A1 | 10/2003 | Kawazoe | |
| 2011/0222789 A1* | 9/2011 | Aizawa | G06K 9/4604 382/229 |
| 2012/0014601 A1* | 1/2012 | Jiang | G06F 1/1626 382/173 |
| 2012/0134591 A1 | 5/2012 | Kimura | |
| 2015/0213333 A1* | 7/2015 | Chen | G06K 9/72 382/185 |

OTHER PUBLICATIONS

Written Opinion for International Patent Application No. PCT/JP2015/063522 dated Aug. 11, 2015, 3 pages.
Murase, et al. "Segmentation and Recognition of Hand-Written Character String using Linguistic Information", J69-D (9), pp. 1292-1301, 1986.
Camastra, et al. "Machine Learning for Audio, Image and Video Analysis: Theory and Applications", Springer-Verlag 2007.
Rosenfeld, et al. "Digital Image Processing (the supervisor of a translation: Makoto Nagao)", Kindai kagaku sha Co., Ltd., 2006.
"New phonetics and sonics", Kindai kagaku sha Co., Ltd., 2006.
Tsuruoka, et al. "Recognition of Handwritten "KANJI" and "HIRAGANA" Character Recognition Using Weighted Direction Index Histogram Method", IEICE academic journal (D), J70-D(7), pp. 1390-1397, 1987.
Bitshop, et al. "Pattern recognition and machine learning", (the supervisor of a translation: Noboru Murata), Springer Japan KK, 2007.
Kita "Probabilistic language model" (Language and computation 5), University of Tokyo Press, 1999.

* cited by examiner

PATTERN RECOGNITION DEVICE, PATTERN RECOGNITION METHOD, AND COMPUTER PROGRAM PRODUCT

CROSS-REFERENCE TO RELATED APPLICATIONS

The present application is a continuation application of International Application No. PCT/JP2015/063522, filed May 11, 2015, the entire contents of which are incorporated herein by reference.

FIELD

Embodiments described herein relate generally to a pattern recognition device, a pattern recognition method, and a computer program product.

BACKGROUND

In a field of pattern recognition, the following two methods are known as a method of performing pattern recognition on an input signal in which a separation point of a recognition unit is not clear. The first method is a method of dividing the input signal into a plurality of elements to be coupled to each other in accordance with a predetermined standard, and individually recognizing each element (hereinafter, this method is referred to as an "analytic method"). The second method is a method of performing recognition and division at the same time while considering every possibility of a division point of the input signal using a stochastic model such as a hidden Markov model (HMM) (hereinafter, this method is referred to as an "wholistic method").

However, in the analytic method, temporarily divided elements are coupled to each other using a heuristic method, so that accuracy in recognition is not sufficiently secured in some cases. On the other hand, in the wholistic method, processing is performed while considering every possibility of the division point, so that a calculation amount is large, and a high-spec hardware resource is required. As described herein, the analytic method and the wholistic method each have a disadvantage, so that there is a demand for a novel technique in which such disadvantages are solved.

DETAILED DESCRIPTION

Figure 1:
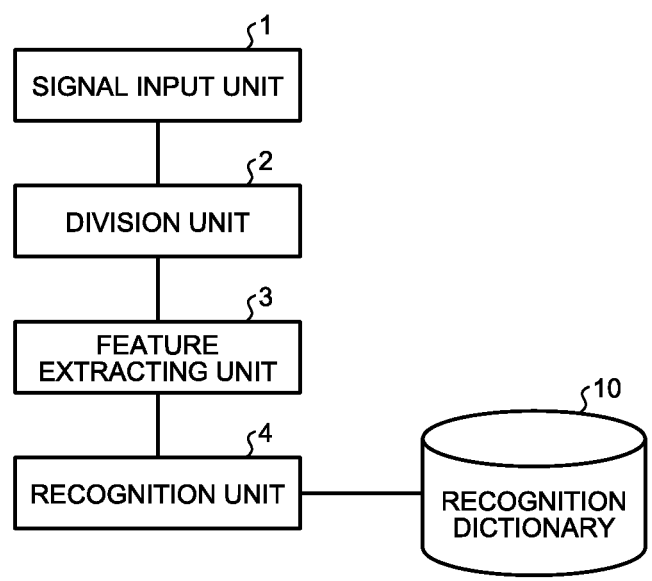
FIG. 1 is a block diagram illustrating a functional configuration example of a pattern recognition device according to an embodiment.

According to an embodiment, a pattern recognition device includes a division unit, a feature extracting unit, and a recognition unit. The division unit is configured to divide an input signal into a plurality of elements. The feature extracting unit is configured to convert the divided elements into feature vectors having the same dimensionality, and generate a set of feature vectors. The recognition unit is configured to evaluate the set of feature vectors using a recognition dictionary, and output a recognition result representing a class or a set of classes to which the input signal belongs. The recognition dictionary includes models corresponding to respective classes. The models each include sub-models each corresponding to one of possible division patterns in which a signal to be classified into a class corresponding to the model can be divided into a plurality of elements. Each sub-model has a state corresponding to each element divided based on a division pattern corresponding to the sub-model, the state being expressed by a function of labels representing a feature vector and the state. The recognition unit outputs, as the recognition result, a label expressing a model including a sub-model conforming to the set of feature vectors, or a set of labels expressing a set of models including sub-models conforming to the set of feature vectors.

The following describes a pattern recognition device, a pattern recognition method, and a computer program product according to an embodiment with reference to the drawings.

The pattern recognition device according to the present embodiment performs pattern recognition on an input signal in which a separation point of a recognition unit is not clear using a novel method combining an analytic method and an wholistic method in the related art. That is, a basic concept is to divide the input signal into a plurality of elements to obtain a set of feature vectors of the elements, and output a recognition result representing a class or a set of classes conforming to the set of feature vectors using a stochastic model.

Typically, a way of dividing the input signal into a plurality of elements (division pattern) is not limited to one for each class. For example, when the input signal is an image of a handwritten character, the image may have different forms depending on a habit and the like of a writer, so that signals to be classified into the same class may be divided in different division patterns. When the signals to be classified into the same class are divided in different division patterns, distribution and the number of feature vectors extracted from respective divided elements are largely different for each element, so that the input signal cannot be properly recognized with a standard model such as a left-to-right model (refer to F. Camastra et al. "Machine Learning for Audio, Image and Video Analysis: Theory and Applications", Springer-Verlag, 2007) in a hidden Markov model.

Thus, in the present embodiment, for each class, each possible division pattern of a signal to be classified into the class is assumed to be a sub-model, and a model obtained by coupling all sub-models is used as a model corresponding to the class.

FIG. 1 is a block diagram illustrating a functional configuration of the pattern recognition device according to the present embodiment. As illustrated in FIG. 1, the pattern recognition device according to the present embodiment includes a signal input unit 1, a division unit 2, a feature extracting unit 3, and a recognition unit 4.

The signal input unit 1 receives an input of a signal as a recognition target. The signal as a recognition target is, for example, a character or a character string represented as an image, other images, a voice signal represented as a waveform, and various sensor signals. To the signal input unit 1, input is such digital information or digital information on which preprocessing such as binarization is performed as needed.

The division unit 2 divides the signal input to the signal input unit 1 into a plurality of elements. Specifically, when the signal input to the signal input unit 1 is a character string image, for example, processing performed by the division unit 2 can be implemented by applying analysis of projection and coupling component described in A. Rosenfeld et al., "Digital image processing" (the supervisor of a translation: Makoto Nagao), Kindai kagaku sha Co., Ltd., 1978, or a method of "Division into basic segment" described in Hiroshi Murase et al., "Segmentation and recognition of character from handwritten character string introducing language information", IEICE academic journal (D), J69-D(9), pp. 1292-1301, 1986.

Figure 2:
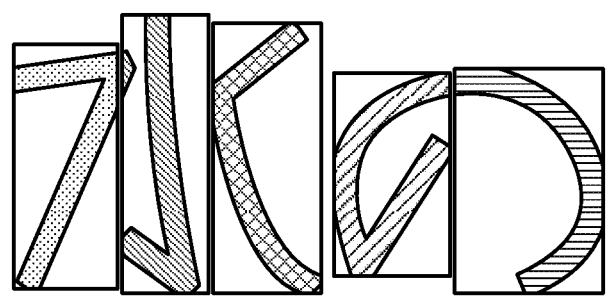
FIG. 2 is a conceptual diagram of processing of dividing an input signal into a plurality of elements.

FIG. 2 is a conceptual diagram of processing of dividing the input signal into a plurality of elements, and illustrates a state in which a character string image of "水の" is divided into five elements by the division unit 2. In the example illustrated in FIG. 2, a direction of dividing the character string image is one direction, but the embodiment is not limited thereto. The signal may be divided into a plurality of elements using a two-dimensional division pattern.

When the signal input to the signal input unit 1 is a signal represented by a time-series waveform such as a voice signal and various sensor signals, for example, processing performed by the division unit 2 can be implemented by applying a method of causing, to be a division point, a point where a state in which signal power is equal to or smaller than a threshold has been continued for a certain time or more.

An order is given to each divided element. The order of each divided element can be determined based on coordinates in a horizontal direction in an image when an original signal is an image, and based on time when the original signal is a time-series waveform such as a voice signal and a sensor signal. In this case, each divided element may be caused to have a structure such as a series, and positional information in the structure may be given thereto. Specific examples include a method of giving, sequentially from the left, a number as the positional information to each element into which the character string image illustrated in FIG. 2 is divided, and a method of giving, in an order of earlier time, a number as the positional information to each element into which the time-series waveform such as a voice signal and various sensor signals is divided. In a case of treating an image in which a division direction is not limited to one, as described later, there is a method of previously determining, for each division pattern, a symbol of each element divided in the division pattern (refer to FIG. 8), and giving the symbol as the positional information.

The feature extracting unit 3 converts respective elements divided by the division unit 2 into feature vectors having the same dimensionality, and generates a set of feature vectors. Specifically, the feature extracting unit 3 performs, on a signal constituting each divided element, preprocessing such as normalizing a length and a quantization level. The feature extracting unit 3 outputs, as a feature vector of the element, a feature vector including, as a component, a value after the preprocessing or a value after performing filter processing such as Gaussian filter and conversion processing such as Fourier transformation on a signal after the preprocessing. In this case, all feature vectors of the respective elements may be normalized so that a norm becomes 1. In this way, the feature extracting unit 3 extracts the feature vector from each element one by one, and generates a set of feature vectors.

As a specific example of processing of converting the element into the feature vector, for example, there is a method of normalizing a time of each element of a voice signal, extracting a feature of a Mel-Frequency Cepstrum Coefficient described in Sadaoki Furui, "New phonetics and sonics", Kindai kagaku sha Co., Ltd., 2006, and directly arranging values as feature vectors. There is also a method of extracting, from each element of the image, a feature of weighted direction index histogram described in Shinji Tsuruoka et al., "Recognition of handwritten kanji/hiragana using weighted direction index histogram method", IEICE academic journal (D), J70-D(7), pp. 1390-1397, 1987.

The recognition unit 4 evaluates, using a recognition dictionary 10, the set of feature vectors generated by the feature extracting unit 3, and outputs a recognition result representing a class or a set of classes to which the signal input to the signal input unit 1 belongs.

The recognition dictionary 10 is a database including a model corresponding to each class treated as a classification destination of the signal by the pattern recognition device according to the present embodiment, and is held inside or outside the pattern recognition device according to the present embodiment. A model of each class held by the recognition dictionary 10 is a stochastic model, and an optional graphical model including the hidden Markov model (refer to C. M. Bishop et al., "Pattern recognition and machine learning", (the supervisor of a translation: Noboru Murata), Springer Japan KK, 2007) can be used.

The recognition unit 4 seeks optimum correspondence with the set of feature vectors generated by the feature extracting unit 3 by singly using or combining (as described later) models included in the recognition dictionary 10. The recognition unit 4 then outputs, as a recognition result, a label expressing a model conforming to the set of feature vectors, or a set of labels expressing a set of models conforming to the set of feature vectors.

Figure 3:
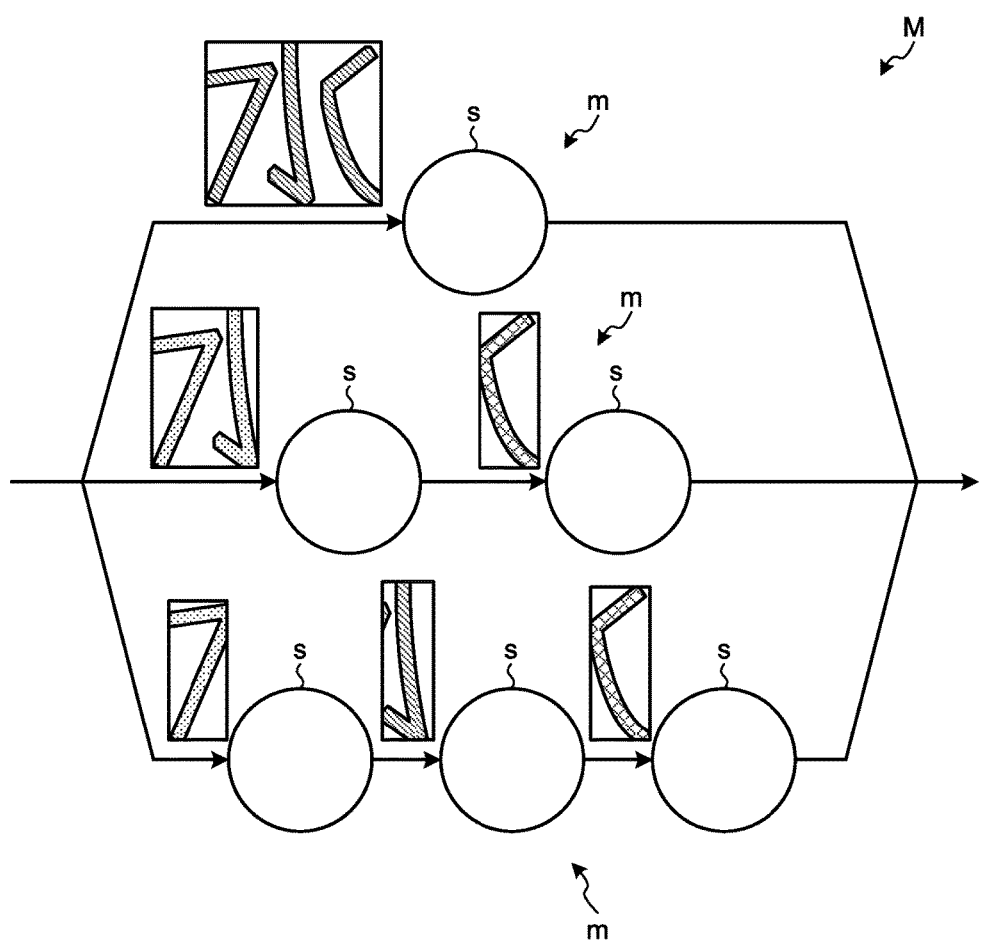
FIG. 3 is a conceptual diagram of a model included in a recognition dictionary.
Figure 4:
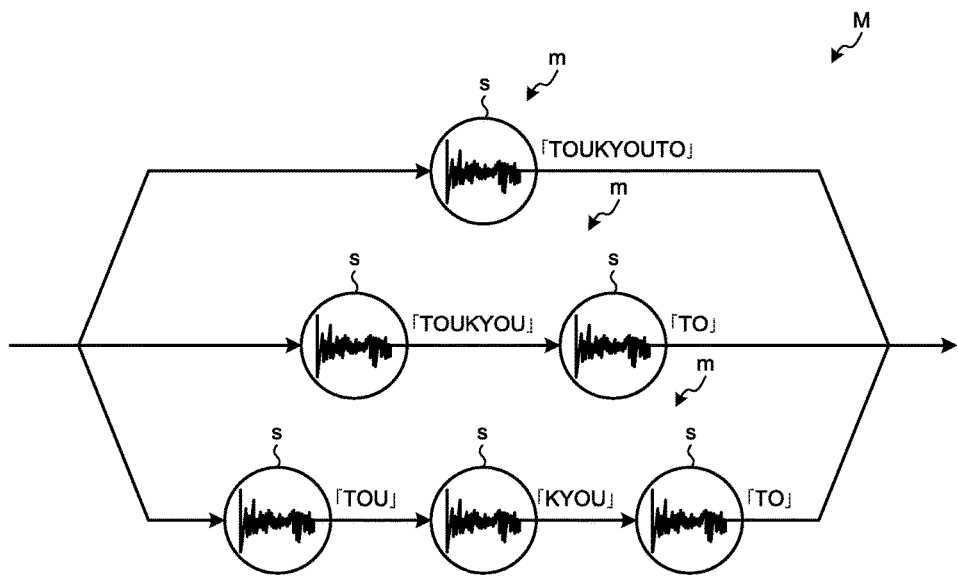
FIG. 4 is a conceptual diagram of a model included in the recognition dictionary.

FIGS. 3 and 4 are conceptual diagrams of a model M included in the recognition dictionary 10. FIG. 3 is an example of the model M corresponding to a class into which a character image of "水" is to be classified, and FIG. 4 is an example of the model M corresponding to a class into which a voice signal of "toukyouto" is to be classified.

As illustrated in FIGS. 3 and 4, the model M treated in the present embodiment is obtained by assuming, as a sub-model m, each possible division pattern in which a signal to be classified into the class corresponding to the model M can be divided into a plurality of elements by the division unit 2, and coupling all sub-models m. A probability that each sub-model m is selected is caused to match with an appearance ratio of each corresponding division pattern in learning data prepared in advance. Alternatively, prior distribution such as uniform distribution may be given to the probability that the model M and the sub-model m are selected, and based on the prior distribution, MAP estimation (refer to C. M. Bishop et al., "Pattern recognition and machine learning", (the supervisor of a translation: Noboru Murata), Springer Japan KK, 2007) may be performed on the probability that the model M and the sub-model m are selected.

The sub-model m of each model M is configured, for example, as a directed graph having, as a node, a state s corresponding to each of the elements divided based on the division pattern corresponding to the sub-model m. In this case, in the sub-model m, the state s may transition only in one direction similarly to the left-to-right model in the hidden Markov model. That is, the sub-model m may have a configuration in which the states s are linearly ordered, and transition from a higher state s to a lower state s is prohibited. FIGS. 3 and 4 exemplify the model M coupling the sub-models m in which the state s can transition only in one direction. By configuring the sub-model m as described above, when learning data is passed to the division unit 2 and the class or the set of classes into which the learning data is classified is known in advance, an assignment of each divided element to each state s of the sub-model m can be definitely given.

Each state s of the sub-model m is expressed by a function of labels representing a feature vector and the state s. For example, this function can be assumed as a probability density function of Gaussian distribution, and a log likelihood of the feature vector can be assumed as an output of the function. In this case, as described above, by using the learning data, into which class or set of classes the learning data is classified being known in advance, a distribution parameter can be estimated using a method such as the EM algorithm, the variational Bayesian method, and the gradient method described in C. M. Bishop et al., "Pattern recognition and machine learning", (the supervisor of a translation: Noboru Murata), Springer Japan KK, 2007, for example.

The following describes a specific example of processing performed by the recognition unit 4 using the model M as described above. The following description assumes an example in which the input signal is classified as a series of a plurality of classes, and the same applies to a case in which the input signal is classified into one class.

Models M are selected in an ordered manner and set as $M_1, \ldots, M_p$ while allowing overlapping and the number equal to or smaller than a length n of feature vector sequences (set of feature vectors) $x_1, \ldots, x_n$ obtained from the input signal. The sub-model m is selected from each model M one by one to set $m_1, \ldots, m_p$, and the total length is caused to be equal to that of a feature vector sequence. The state of the sub-model m thus obtained is set as $s_1, \ldots, s_n$, and an evaluation function of the feature vector is given by the following expression (1).

Expression 1

$$f(x_1, \ldots, x_n | m_1, \ldots, m_p) = \tag{1}$$
$$f_1(M_1, \ldots, M_p) + f_2(m_1, \ldots, m_p | M_1, \ldots, M_p) + \sum_{j=1}^{n} f_3^{(j)}(x_j | s_j)$$

In this case, $f_1$ is an evaluation function such as a probability of N-gram (Kenji Kita, "Probabilistic language model" (Language and computation 5), University of Tokyo Press, 1999) determined by a sequence of the model M itself, $f_2^{(i)}$ is an evaluation function such as a selection probability of the sub-model m associated with selection of a sub-model $m_i$ in a model $M^i$, and $f_3^{(j)}$ is an evaluation function such as a probability density function of a state $s_j$ associated with assignment of a feature vector $x_j$ to the state $s_j$.

In this case, when the sub-model m is configured such that the state s can transition only in one direction as described above, $M_1, \ldots, M_p$ and $m_1, \ldots, m_p$ that maximize the sub-model m can be efficiently calculated using a Viterbi algorithm as described in F. Camastra et al., "Machine Learning for Audio, Image and Video Analysis: Theory and Applications", Springer-Verlag, 2007. Then, $M_1, \ldots, M_p$ that maximize the sub-model m are output as a recognition result.

Figure 5:
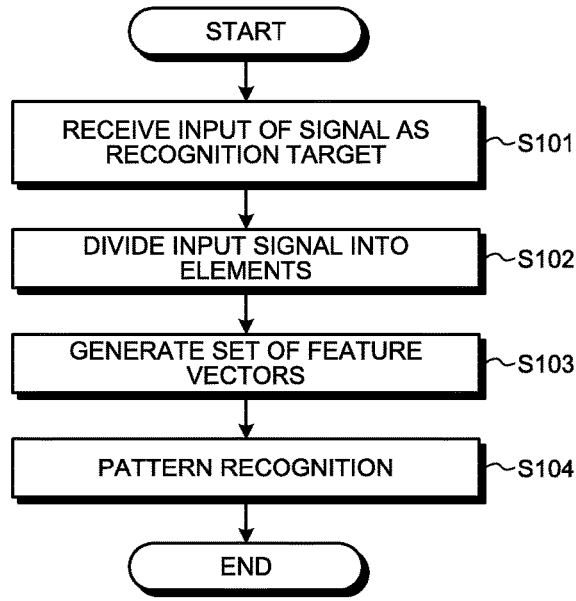
FIG. 5 is a flowchart illustrating an example of a processing procedure performed by the pattern recognition device according to the embodiment.

The following describes an outline of processing performed by the pattern recognition device according to the present embodiment with reference to FIG. 5. FIG. 5 is a flowchart illustrating an example of a processing procedure performed by the pattern recognition device according to the embodiment.

First, the signal input unit 1 receives an input of a signal as a recognition target (Step S101). The signal input to the signal input unit 1 is passed to the division unit 2.

Next, the division unit 2 receives the signal input at Step S101 from the signal input unit 1, and divides the signal into a plurality of elements (Step S102). Each of the elements divided by the division unit 2 is passed to the feature extracting unit 3.

Next, the feature extracting unit 3 receives each element divided at Step S102 from the division unit 2, and obtain the feature vector for each element using the method described above to generate a set of feature vectors (Step S103). The set of feature vectors generated by the feature extracting unit 3 is passed to the recognition unit 4.

Next, the recognition unit 4 receives the set of feature vectors generated at Step S103 from the feature extracting unit 3, evaluates the set of feature vectors using the recognition dictionary 10, and outputs a recognition result representing the class or the set of classes to which the signal input at Step S101 belongs (Step S104).

As described above with specific examples, in the present embodiment, as the model M corresponding to each class as a classification destination of the signal, defined is a stochastic model coupled with the sub-model m corresponding to various division patterns of the signal to be classified into the model M. By using the recognition dictionary 10 including the model M for each class, the set of feature vectors obtained from the input signal is evaluated, and a recognition result representing the class or the set of classes to which the input signal belongs is output. Accordingly, with the pattern recognition device according to the present embodiment, disadvantages of the analytic method and the wholistic method in the related art are solved, and the input signal in which a separation point of a recognition unit is not clear can be recognized with high accuracy with a small calculation amount.

Figure 6:
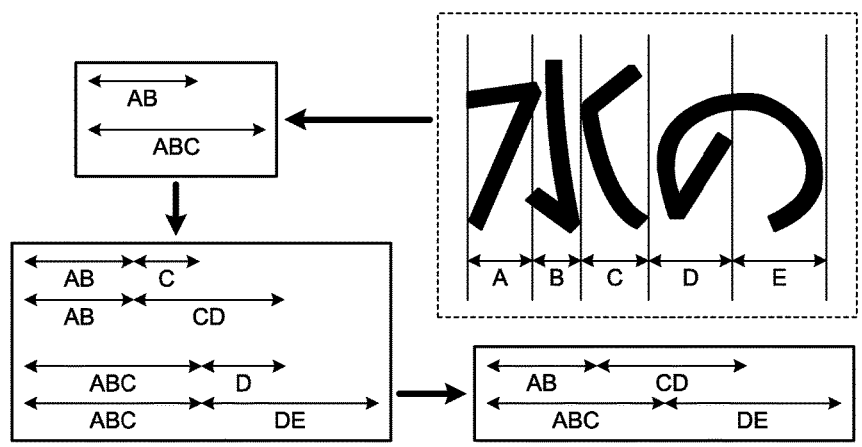
FIG. 6 is a conceptual diagram for explaining an analytic method in the related art.

In the analytic method in the related art, as illustrated in FIG. 6, the input signal is divided into a plurality of elements, which are then coupled to each other in a unit of a recognition target (in the example of FIG. 6, a character) to be recognized through pattern matching and the like. The elements are coupled to each other using a heuristic method such that a separation point is determined assuming an average size of a character, for example. Thus, in the example of FIG. 6, for example, an element of A and an element of B, and an element of C and an element of D may be regarded as one recognition target to be processed, and accuracy in recognition cannot be sufficiently secured in this case. On the other hand, the pattern recognition device according to the present embodiment uses the model M that is a stochastic model corresponding to each class treated as a classification destination of the signal, searches for the model M or a set of models M conforming to the set of feature vectors obtained from the input signal, and outputs a recognition result representing the class or the set of classes to which the input signal belongs, so that the input signal in which a separation point of a recognition unit is not clear can be recognized with high accuracy.

In the wholistic method in the related art, pattern recognition is performed on the input signal using the stochastic model such as the hidden Markov model. In this method, processing is performed considering various possibilities of the division point, so that a calculation amount is large, and a high-spec hardware resource is required. On the other hand, the pattern recognition device according to the present embodiment uses the model M coupled with the sub-model m corresponding to a division pattern assumed in advance for each class, searches for the model M or a set of models M conforming to the set of feature vectors obtained from the input signal, and outputs a recognition result representing the class or the set of classes to which the input signal belongs, so that recognition can be performed with a small calculation amount.

As described above, with the pattern recognition device according to the present embodiment, disadvantages of the analytic method and the wholistic method in the related art are solved, and the input signal in which a separation point of a recognition unit is not clear can be recognized with high accuracy with a small calculation amount.

The recognition dictionary 10 used in the present embodiment may include a reject model not corresponding to any class as a classification destination of the signal. As the reject model, for example, one model obtained by extracting only the sub-model m as part of another model M, or a model obtained by coupling models the parameter values of which are randomly determined can be used. In this case, for example, when the reject model is included in $M_1, \ldots, M_p$ in the expression (1) described above, the recognition unit 4 treats this as a reject, and outputs information indicating that the recognition result cannot be obtained. Due to this, in a case in which the input signal itself is not correct such as a case in which an image of an erroneous handwritten character is input, a user can be notified that the input signal is not correct.

Assuming that noise included in the input signal is erroneously treated as one element, a model (noise model) including only one sub-model having only one state may be provided as one of reject models as described above, and an evaluation function corresponding to the only one state in the noise model may return a value 0 or a parameter value of which may be randomly determined.

Figure 7:
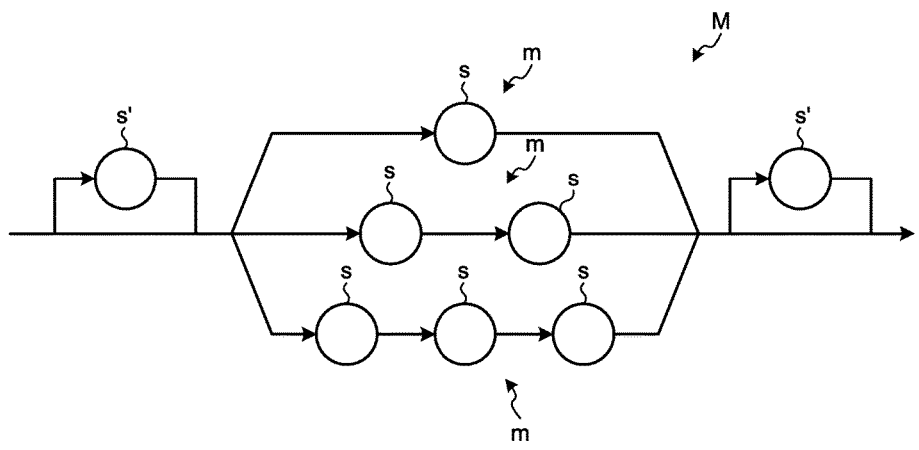
FIG. 7 is a conceptual diagram of a model including a noise state.

As illustrated in FIG. 7, at least one of the models M included in the recognition dictionary 10 may be configured to have a noise state s' as a state not corresponding to any of the elements included in the signal to be classified into the class corresponding to the model M. By configuring the model M as described above, even when the noise included in the input signal is erroneously treated as one element, the element is correctly recognized as noise, and deterioration in recognition accuracy due to mixing of noise can be effectively suppressed.

In the above description, mainly assumed is a case in which a division direction in dividing the input signal into elements is one direction. Even when the division direction is not one direction, the same processing can be performed so long as the division pattern thereof is determined in advance. For example, a Korean character and the like are preferably divided into elements using a two-dimensional division pattern, and the pattern recognition device according to the present embodiment can be effectively applied to recognition of such a Korean character.

Figure 8A:
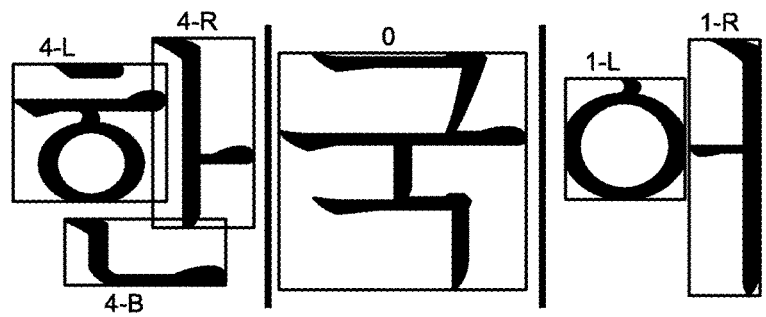
FIGS. 8A and 8B are conceptual diagrams of processing of dividing Korean characters into elements.
Figure 8B:
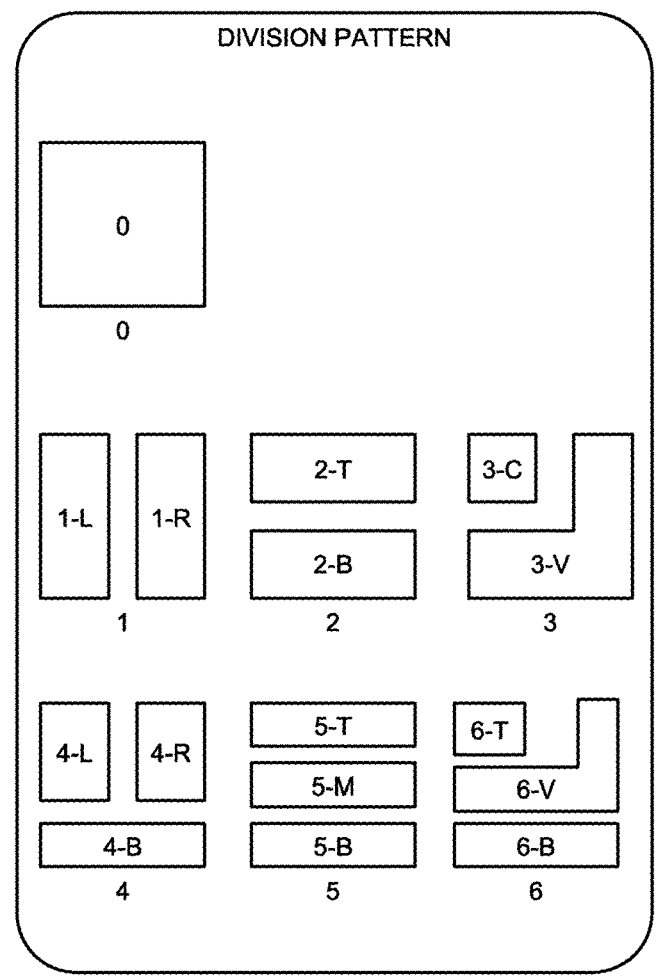

FIGS. 8A and 8B are conceptual diagrams of processing of dividing Korean characters into elements. When an image of a Korean character string is input as a signal as a recognition target, for example, as illustrated in FIG. 8A, the image of the character string is firstly divided in character units by projection in a vertical direction. An operation of performing coupling component analysis for each character and selecting one group of adjacent coupling components to be integrated in the vertical direction is repeated until the components match with any of division patterns determined in advance as illustrated in FIG. 8B. A symbol of each element determined in advance for each division pattern is then given as positional information for each of the elements obtained in the above operation.

Figure 9:
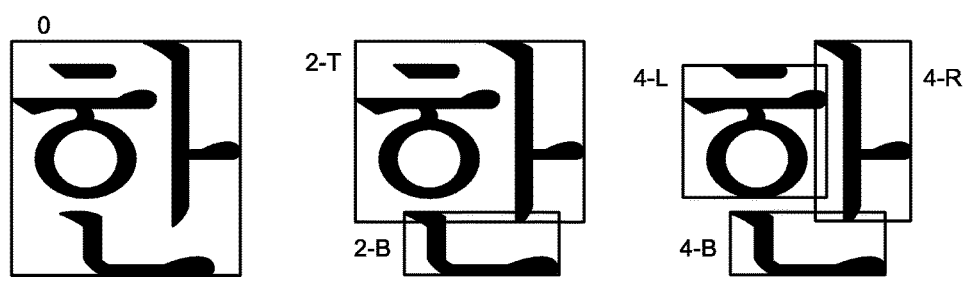
FIG. 9 is a diagram illustrating an example of division patterns of a Korean character.

As illustrated in FIG. 9, the leftmost character in the Korean character string illustrated in FIG. 8A may be divided in division patterns indicated by 0, 2, and 4 among division patterns illustrated in FIG. 8B. Thus, the model M corresponding to the class into which this character is to be classified is assumed to be obtained by coupling sub-models m corresponding to the respective division patterns illustrated in FIG. 9. Due to this, pattern recognition can be performed with high accuracy using a method similar to the method described above.

Figure 10:
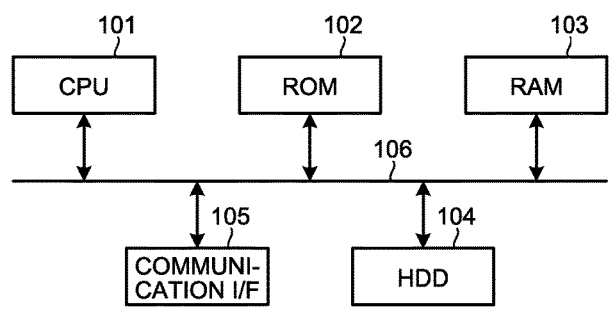
FIG. 10 is a block diagram illustrating a hardware configuration example of the pattern recognition device according to the embodiment.

As illustrated in FIG. 10 for example, the pattern recognition device according to the present embodiment may employ a hardware configuration utilizing a typical computer including a processor such as a central processing unit (CPU) 101, a storage device such as a read only memory (ROM) 102 and a random access memory (RAM) 103, an auxiliary storage device such as a hard disk drive (HDD) 104, a communication I/F 105 to be connected to a network to perform communication, and a bus 106 for connecting respective components. In this case, each functional component described above can be implemented by executing a predetermined pattern recognition program on the computer.

This pattern recognition program is recorded and provided as a computer program product in a computer-readable recording medium such as a compact disc read only memory (CD-ROM), a flexible disk (FD), a compact disc recordable (CD-R), and a digital versatile disc (DVD), as an installable or executable file.

This pattern recognition program may be stored in another computer connected to a network such as the Internet and provided by being downloaded via the network. Furthermore, this pattern recognition program may be provided or distributed via a network such as the Internet.

This pattern recognition program may be embedded and provided in a ROM 102, for example.

This pattern recognition program has a module configuration including processing units of the pattern recognition device according to the present embodiment (the signal input unit 1, the division unit 2, the feature extracting unit 3, and the recognition unit 4). As actual hardware, for example, when the CPU 101 (processor) reads the computer program from the recording medium to be executed, the processing units described above are loaded into the RAM 103 (main memory), and the processing units described above are generated on the RAM 103 (main memory). Part or all of the processing units of the pattern recognition device according to the present embodiment can be implemented using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern recognition device comprising:
processing circuitry configured to function as:
a division unit configured to divide an input signal into a plurality of elements;
a feature extracting unit configured to convert the divided elements into feature vectors having the same dimensionality, and generate a set of feature vectors; and
a recognition unit configured to evaluate the set of feature vectors using a recognition dictionary, and output a recognition result representing a class or a set of classes to which the input signal belongs, wherein
the recognition dictionary includes models corresponding to respective classes,
the models each include sub-models each corresponding to one of possible division patterns in which a signal to be classified into a class corresponding to the model can be divided into a plurality of elements,
each sub-model has a state corresponding to each element divided based on a division pattern corresponding to the sub-model, the state being expressed by a function of labels representing a feature vector and the state, and
the recognition unit outputs, as the recognition result, a label expressing a model including a sub-model conforming to the set of feature vectors, or a set of labels expressing a set of models including sub-models conforming to the set of feature vectors.

2. The device according to claim 1, wherein, in the sub-model, each state is linearly ordered, and transition from a higher state to a lower state is prohibited.

3. The device according to claim 1, wherein
the recognition dictionary includes a reject model as a model not corresponding to any class, and
the recognition unit outputs information indicating that the recognition result is not obtained when the set of feature vectors conforms to the reject model.

4. The device according to claim 1, wherein at least one of the models included in the recognition dictionary further has a noise state as a state not corresponding to any element included in a signal to be classified into a class corresponding to the model.

5. The device according to claim 1, wherein, in a state of a sub-model, a function held by the state is determined based on a set of feature vectors to be an input to the state when a signal serving as learning data is input to the pattern recognition device, and a probability of input.

6. A pattern recognition method executed by a pattern recognition device, comprising:

dividing an input signal into a plurality of elements by the pattern recognition device;
converting the divided elements into feature vectors having the same dimensionality, and generating a set of feature vectors by the pattern recognition device; and
evaluating the set of feature vectors using a recognition dictionary, and outputting a recognition result representing a class or a set of classes to which the input signal belongs by the pattern recognition device, wherein
the recognition dictionary includes models corresponding to respective classes,
the models each include sub-models each corresponding to one of possible division patterns in which a signal to be classified into a class corresponding to the model can be divided into a plurality of elements,
each sub-model has a state corresponding to each element divided based on a division pattern corresponding to the sub-model, the state being expressed by a function of labels representing a feature vector and the state, and
a label expressing a model including a sub-model conforming to the set of feature vectors, or a set of labels expressing a set of models including sub-models conforming to the set of feature vectors is output as the recognition result at the outputting.

7. A computer program product comprising a non-transitory computer-readable medium including programmed instructions, the instructions causing a computer to implement:
a function of a division unit configured to divide an input signal into a plurality of elements;
a function of a feature extracting unit configured to convert the divided elements into feature vectors having the same dimensionality, and generate a set of feature vectors; and
a function of a recognition unit configured to evaluate the set of feature vectors using a recognition dictionary, and output a recognition result representing a class or a set of classes to which the input signal belongs, wherein
the recognition dictionary includes models corresponding to respective classes,
the models each include sub-models each corresponding to one of possible division patterns in which a signal to be classified into a class corresponding to the model can be divided into a plurality of elements,
each sub-model has a state corresponding to each element divided based on a division pattern corresponding to the sub-model, the state being expressed by a function of labels representing a feature vector and the state, and
the recognition unit outputs, as the recognition result, a label expressing a model including a sub-model conforming to the set of feature vectors, or a set of labels expressing a set of models including sub-models conforming to the set of feature vectors.

* * * * *